US012177653B2

(12) United States Patent
Wu

(10) Patent No.: US 12,177,653 B2
(45) Date of Patent: Dec. 24, 2024

(54) PATH SWITCHING METHOD AND DEVICE

(71) Applicant: VIVO MOBILE COMMUNICATION CO., LTD., Guangdong (CN)

(72) Inventor: Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 325 days.

(21) Appl. No.: 17/585,938

(22) Filed: Jan. 27, 2022

(65) Prior Publication Data

US 2022/0150772 A1 May 12, 2022

Related U.S. Application Data

(63) Continuation of application No. PCT/CN2020/100277, filed on Jul. 3, 2020.

(30) Foreign Application Priority Data

Aug. 1, 2019 (CN) .......................... 201910708719.3

(51) Int. Cl.
*H04W 4/00* (2018.01)
*H04W 36/00* (2009.01)
(Continued)

(52) U.S. Cl.
CPC ..... *H04W 36/00837* (2018.08); *H04W 36/08* (2013.01); *H04W 40/36* (2013.01); *H04W 74/0833* (2013.01); *H04W 36/0069* (2018.08)

(58) Field of Classification Search
CPC ....... H04W 36/0069; H04W 36/00837; H04W 40/36; H04W 74/0833; H04W 40/34;
(Continued)

(56) References Cited

U.S. PATENT DOCUMENTS 11,013,035 B2 * 5/2021 Takeda ............. H04W 72/0446
2012/0218973 A1 8/2012 Du et al.
(Continued)

FOREIGN PATENT DOCUMENTS

CN 101370267 A 2/2009
CN 102123457 A 7/2011
(Continued)

OTHER PUBLICATIONS

Ericsson, "Uplink handling in RUDI HO", 3GPP TSG-RAN WG2 #107bis, Tdoc R2-1912356, Chongqing, China, Oct. 10-14, 2019.
Vivo, "Summary of Email Discussion on MAC aspects for LTE mobility", 3GPP TSG-RAN WG2 Meeting #107bis, R2-1912336, Chongqing, China, Oct. 14-18, 2019.
Ericsson, "Uplink handling during handover with simultaneous connectivity", 3GPP TSG-RAN WG2 #107, Tdoc R2-1908971, Prague, Czech Republic, Aug. 25-30, 2019.
(Continued)

*Primary Examiner* — Chuong T Ho
(74) *Attorney, Agent, or Firm* — Price Heneveld LLP

(57) ABSTRACT

A method includes: switching a sending path of uplink data from a source cell to a target cell based on a first condition or a target uplink grant, where the first condition includes: switching the sending path in a case of successful switching, switching the sending path when a secondary cell group SCG is changed successfully, switching the sending path when random access of the target cell succeeds in a switching process, or switching the sending path when random access of the target cell succeeds in an SCG change process; the target uplink grant is an uplink grant that is used for the target cell and that is used by a MAC layer of the UE when a predetermined condition is met.

18 Claims, 6 Drawing Sheets

(51) Int. Cl.
*H04W 36/08* (2009.01)
*H04W 40/36* (2009.01)
*H04W 74/0833* (2024.01)

(58) Field of Classification Search
CPC .. H04W 36/08; H04W 36/0077; H04W 36/02
USPC ......................................................... 370/331
See application file for complete search history.

(56) References Cited

U.S. PATENT DOCUMENTS

| | | | |
|---|---|---|---|
| 2014/0226621 A1* | 8/2014 | Choi ................. | H04W 36/0061 370/331 |
| 2016/0157219 A1 | 6/2016 | Uemura et al. | |
| 2018/0213456 A1* | 7/2018 | Jheng ................ | H04W 28/0273 |
| 2019/0098539 A1* | 3/2019 | Zhang ............... | H04W 36/0033 |
| 2019/0150217 A1* | 5/2019 | Kim ...................... | H04L 1/1809 370/329 |
| 2020/0022043 A1* | 1/2020 | Pelletier ................ | H04W 36/08 |
| 2020/0296759 A1* | 9/2020 | Agiwal ................ | H04L 1/1822 |
| 2020/0351734 A1* | 11/2020 | Purkayastha ..... | H04W 36/0094 |
| 2022/0110037 A1* | 4/2022 | Bergqvist .............. | H04W 72/23 |
| 2022/0150777 A1* | 5/2022 | Bergqvist ........ | H04W 36/00725 |

FOREIGN PATENT DOCUMENTS

| | | |
|---|---|---|
| CN | 106060870 A | 10/2016 |
| CN | 106817735 A | 6/2017 |
| CN | 106941733 A | 7/2017 |
| CN | 109673023 A | 4/2019 |
| WO | 2014161170 A1 | 10/2014 |
| WO | 2019032665 A1 | 2/2019 |

OTHER PUBLICATIONS

Mediatek Inc et al., "Support Dual Active Protocol Stacks to Minimize HO Interruption", 3GPP TSG RAN WG2 Meeting #106, R2-1905892, Reno, USA, May 13-17, 2019.

Vivo, "Considerations on the 2-step RACH procedure", 3GPP TSG-RAN WG2 Meeting #105bis, R2-1903077, Xi'an, China, Apr. 12, 2019.

Vivo, "UE behavior at UL path switch", 3GPP TSG-RAN WG2 Meeting #100, R2-1713008, Reno, USA, Nov. 27-Dec. 1, 2017.

Huawei et al., "On support for transmission in preconfigured UL resources", 3GPP TSG RAN WGI Meeting #94, RI-1808108, Gothenburg, Sweden, Aug. 20-24, 2018.

3GPP, 3rd Generation Partnership Project; Technical Specification Group Radio Access Network; NR; Medium Access Control (MAC) protocol specification (Release 15); 3GPP TS 38.321 V15.6.0 (Jun. 2019).

Nokia, Nokia Shanghai Bell, Report from [104#61][LTE/feMOB] Solution directions for minimizing user data interruption for UL/DL (Nokia), LTE_feMob—Release 16, 3GPP TSG-RAN WG2 Meeting #105, R2-1900619, Feb. 25-Mar. 1, 2019, Athens, Greece.

Intel Corporation, New WID: NR mobility enhancements, 3GPP TSG RAN Meeting #83, RP-190489, Mar. 18-21, 2019, Shenzhen, China.

"3rd Generation Partnership Project; Technical Specification Group Radio Access Network; Evolved Universal Terrestrial Radio Access Network; (E-UTRAN); Extension of dual connectivity in E-UTRAN (Release 13)", 3GPP TR 36.875 V13.0.0 (Jun. 2015), Valbonne, France.

* cited by examiner

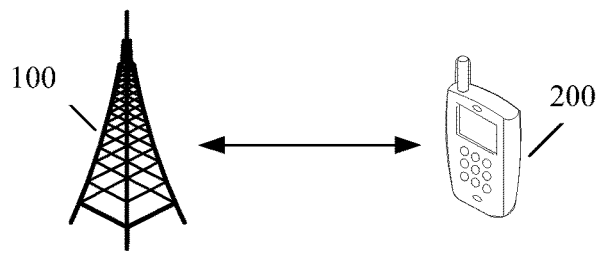
FIG. 1
UE switches a sending path of uplink data from a source cell to a target cell based on a first condition or a target uplink grant  ⎯201
FIG. 2
The UE switches the sending path of the uplink data from the source cell to the target cell based on the target uplink grant  ⎯401
FIG. 3
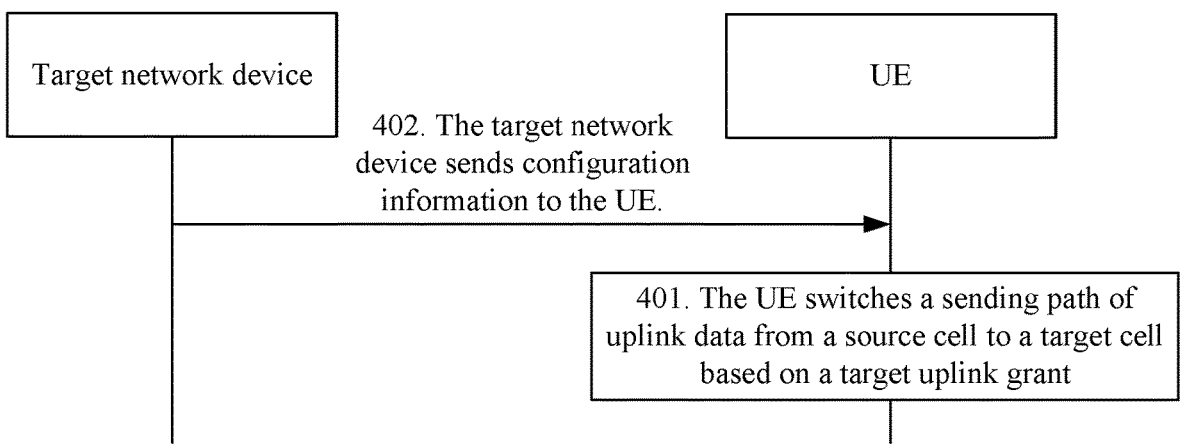
FIG. 4

PATH SWITCHING METHOD AND DEVICE

CROSS-REFERENCE TO RELATED APPLICATIONS

This application is a continuation application of International Application No. PCT/CN2020/100277 filed on Jul. 3, 2020, which claims priority to Chinese Patent Application No. 201910708719.3 filed in China on Aug. 1, 2019, which are incorporated herein by reference in their entireties.

TECHNICAL FIELD

Embodiments of the present disclosure relate to the field of communications technologies, and in particular, to a path switching method and device.

BACKGROUND

Dual connectivity means that user equipment (UE) may establish connections in two cell groups (namely, a master cell group (MCG) and a secondary cell group (SCG)) at the same time. The MCG includes at least a primary cell (PCell), and may further include at least one secondary cell (SCell). The SCG includes at least a primary secondary cell (PSCell), and may further include at least one SCell. Both PCell and PSCell may be alternatively referred to as SpCells (Special Cell). In a dual-connectivity mobility procedure (for example, switching or SCG change), the UE may establish connections in a source cell and a target cell at the same time. Then, the UE may release the connection to the source cell, and retain only the connection to the target cell.

However, in the dual-connectivity mobility procedure, because a capability of the UE is limited or network deployment complexity is limited, the UE may be able to send uplink date on only one path at one moment.

In this way, in the dual-connectivity mobility procedure, if the UE cannot switch a sending path of the uplink data from the source cell to the target cell in time, sending of the uplink data may be interrupted or delayed.

SUMMARY

Embodiments of the present disclosure provide a path switching method and device, to solve a problem in a dual-connectivity mobility procedure that sending of uplink data is interrupted or delayed due to late path switching.

To solve the foregoing technical problem, the present disclosure is implemented as follows.

According to a first aspect, an embodiment of the present disclosure provides a path switching method, applied to UE. The method includes: switching a sending path of uplink data from a source cell to a target cell based on a first condition or a target uplink grant, where the first condition includes any one of the following: switching the sending path in a case of successful switching, switching the sending path when a secondary cell group SCG is changed successfully, switching the sending path when random access of the target cell succeeds in a switching process, and switching the sending path when random access of the target cell succeeds in an SCG change process; the target uplink grant is an uplink grant that is used for the target cell and that is used by a MAC layer of the UE when a predetermined condition is met; and the predetermined condition includes any one of the following: the switching succeeds, the SCG is changed successfully, the random access of the target cell succeeds in the switching process, and the random access of the target cell succeeds in the SCG change process.

According to a second aspect, an embodiment of the present disclosure provides UE, including a switching module, configured to switch a sending path of uplink data from a source cell to a target cell based on a first condition or a target uplink grant, where the first condition includes any one of the following: switching the sending path in a case of successful switching, switching the sending path when a secondary cell group SCG is changed successfully, switching the sending path when random access of the target cell succeeds in a switching process, and switching the sending path when random access of the target cell succeeds in an SCG change process; the target uplink grant is an uplink grant that is used for the target cell and that is used by a MAC layer of the UE when a predetermined condition is met; and the predetermined condition includes any one of the following: the switching succeeds, the SCG is changed successfully, the random access of the target cell succeeds in the switching process, and the random access of the target cell succeeds in the SCG change process.

In the embodiments of the present disclosure, the UE switches the sending path of the uplink data from the source cell to the target cell based on the first condition or the target uplink grant. According to the solution, in a dual-connectivity mobility procedure, the UE can switch the sending path of the uplink data from the source cell to the target cell in time (briefly referred to as switching of the sending path of the uplink data below) in the case of successful switching, or when the SCG is changed successfully, or when the random access of the target cell succeeds in the switching process, or when the random access of the target cell succeeds in the SCG change process. In other words, the UE has switched the sending path of the uplink data from the source cell to the target cell when the UE needs to send the uplink data by using the target cell, and interruption or delaying of sending of the uplink data can be avoided. Alternatively, the UE switches the sending path of the uplink data based on the uplink grant that is used for the target cell and that is used by the MAC layer of the UE, when the predetermined condition (the switching succeeds, the SCG is changed successfully, the random access of the target cell succeeds in the switching process, or the random access of the target cell succeeds in the SCG change process) is met. In other words, the UE switches the sending path of the uplink data when the MAC layer of the UE uses the uplink grant. In this way, to some extent, the UE has switched the sending path of the uplink data from the source cell to the target cell when the UE needs to send the uplink data by using the target cell, and a probability of interruption or delaying of sending of the uplink data can be reduced.

According to a third aspect, an embodiment of the present disclosure provides a path switching method, applied to a target network device to which a target cell belongs. The method includes: sending a target uplink grant to UE in a random access process of the target cell, where the target uplink grant is an uplink grant used by a MAC layer of UE when a predetermined condition is met; and the predetermined condition includes any one of the following: switching succeeds, a secondary cell group SCG is changed successfully, the random access succeeds in a switching process, and the random access succeeds in an SCG change process; and the target uplink grant is used to switch a sending path of uplink data.

According to a fourth aspect, an embodiment of the present disclosure provides a network device, where the network device is a target network device to which a target cell belongs. The network device includes: a sending module, configured to send a target uplink grant to UE in a random access process of the target cell, where the target uplink grant is an uplink grant used by a MAC layer of UE when a predetermined condition is met; and the predetermined condition includes any one of the following: switching succeeds, a secondary cell group SCG is changed successfully, the random access succeeds in a switching process, and the random access succeeds in an SCG change process; and the target uplink grant is used to switch a sending path of uplink data.

In the embodiments of the present disclosure, the target network device to which the target cell belongs sends the target uplink grant to the UE in the random access process of the target cell, where the target uplink grant is the uplink grant used by the MAC layer of the UE when the predetermined condition is met; and the predetermined condition includes any one of the following: the switching succeeds, the secondary cell group SCG is changed successfully, the random access succeeds in the switching process, and the random access succeeds in the SCG change process; and the target uplink grant is used to switch the sending path of the uplink data. According to the solution, in a dual-connectivity mobility procedure, the target network device sends the target uplink grant (the uplink grant used by the MAC layer of the UE when the predetermined condition is met; used to switch the sending path of the uplink data) to the UE in the random access process, so that the UE can switch the sending path of the uplink data in time by using the target uplink grant in the dual-connectivity mobility procedure, to reduce a probability of interruption or delaying of sending of the uplink data.

According to a fifth aspect, an embodiment of the present disclosure provides a path switching method, applied to a target network device to which a target cell belongs. The method includes: sending, based on a target condition, target indication information to a source network device to which a source cell belongs, where the target indication information is used to indicate that UE has switched a sending path of uplink data from the source cell to the target cell; the target condition includes any one of the following: performing sending when the target network device receives uplink data that is sent by the UE by using the target cell, performing sending when a predetermined condition is met, and performing sending when the predetermined condition is met and the target network device sends the first uplink grant used for the target cell to the UE; and the predetermined condition includes any one of the following: switching succeeds, an SCG is changed successfully, random access of the target cell succeeds in a switching process, and random access of the target cell succeeds in an SCG change process.

According to a sixth aspect, an embodiment of the present disclosure provides a network device, where the network device is a target network device to which a target cell belongs. The network device includes: a sending module, configured to send, based on a target condition, target indication information to a source network device to which a source cell belongs, where the target indication information is used to indicate that UE has switched a sending path of uplink data from the source cell to the target cell; the target condition includes any one of the following: performing sending when the target network device receives uplink data that is sent by the UE by using the target cell, performing sending when a predetermined condition is met, and performing sending when the predetermined condition is met and the target network device sends the first uplink grant used for the target cell to the UE; and the predetermined condition includes any one of the following: switching succeeds, an SCG is changed successfully, random access of the target cell succeeds in a switching process, and random access of the target cell succeeds in an SCG change process.

In the embodiments of the present disclosure, the target network device to which the target cell belongs sends, based on the target condition, the target indication information to the source network device to which the source cell belongs, where the target indication information is used to indicate that UE has switched the sending path of the uplink data from the source cell to the target cell. According to the solution, in a dual-connectivity mobility procedure, the target network device sends the target indication information to the source network device, so that after receiving the target indication information, the source network device can learn in time that the UE has switched the sending path of the uplink data and the source network device does not need to re-send a dynamically scheduled uplink grant to the UE, to avoid interruption or delaying of sending of the uplink data.

According to a seventh aspect, an embodiment of the present disclosure provides UE, including a processor, a memory, and a computer program that is stored in the memory and that is capable of being executed by the processor. When the computer program is executed by the processor, the steps of the path switching method according to the first aspect are implemented.

According to an eighth aspect, an embodiment of the present invention provides a network device, including a processor, a memory, and a computer program that is stored in the memory and that is capable of being executed by the processor, and when the computer program is executed by the processor, the steps of the path switching method according to the third aspect or the fifth aspect are implemented.

According to a ninth aspect, an embodiment of the present disclosure provides a communications system, where the communications system includes the UE in the second aspect and the network device in the fourth aspect; or the communications system includes the UE in the second aspect and the network device in the sixth aspect; or the communications system includes the UE in the seventh aspect and the network device in the eighth aspect.

According to a tenth aspect, an embodiment of the present disclosure provides a computer-readable storage medium, where the computer-readable storage medium stores a computer program, and when the computer program is executed by a processor, the steps of the path switching methods in the first aspect, the third aspect, and the fifth aspect are implemented.

DESCRIPTION OF DRAWINGS

FIG. 1 is a schematic architectural diagram of a communications system according to an embodiment of the present disclosure;

FIG. 2 is a first flowchart of a path switching method according to an embodiment of the present disclosure;

FIG. 3 is a second flowchart of a path switching method according to an embodiment of the present disclosure;

FIG. 4 is a third flowchart of a path switching method according to an embodiment of the present disclosure;

DETAILED DESCRIPTION OF EMBODIMENTS

Figure 5:
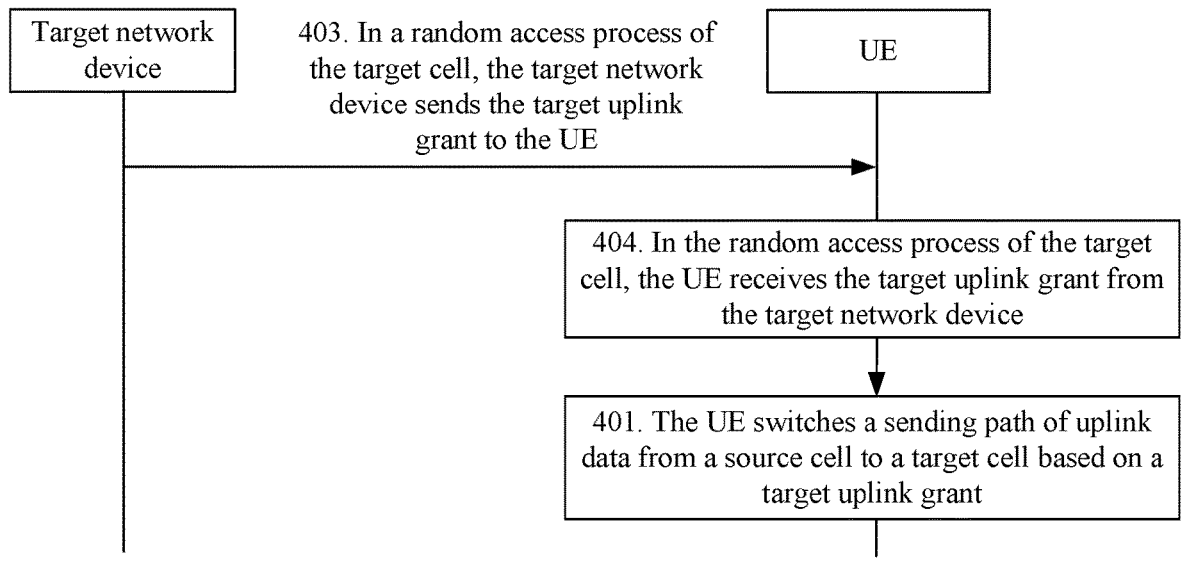
FIG. 5 is a fourth flowchart of a path switching method according to an embodiment of the present disclosure.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, the term such as "exemplary" or "for example" is used to represent giving an example, an illustration, or a description. Any embodiment or design scheme described as an "exemplary" or "example" in the embodiments of the present disclosure should not be explained as being more preferred or having more advantages than another embodiment or design scheme. To be precise, the use of the term such as "exemplary" or "for example" is intended to present a related concept in a specific manner. In this specification, "of", "relevant", and "corresponding" may be used in a mixed manner. It should be noted that, when a difference is not emphasized, meanings to be expressed by them are the same.

In the description of the embodiments of the present disclosure, unless otherwise specified, the meaning of "a plurality of" means two or more. For example, a plurality of processing units mean two or more processing units, and a plurality of elements mean two or more elements.

The technical solutions provided in the present disclosure may be applied to various communications systems, for example, a 5G communications system, a future evolved system, or a plurality of communications fusion systems. A plurality of application scenarios may be included, for example, a machine to machine (M2M) scenario, a D2M scenario, a macro-micro communication scenario, an enhanced mobile broadband (eMBB) scenario, an ultra reliable and low latency communication (uRLLC) scenario, and a massive machine type communication (mMTC) scenario. These scenarios include, but not limited to: scenarios such as communication between UE and UE, communication between network devices, or communication between a network device and UE. The embodiments of the present disclosure may be applied to communication between a network device and UE, communication between UE and UE, or communication between network devices in a 5G communications system.

FIG. 1 is a possible schematic structural diagram of a communications system according to an embodiment of the present disclosure. As shown in FIG. 1, the communications system includes at least one network device 100 (only one network device is shown in FIG. 1) and one or more UE 200 (only one UE is described in FIG. 1 by way of example) connected to each network device 100.

The at least one network device 100 may serve at least one cell group (for example, an MCG or an SCG). One MCG includes at least one PCell, and may further include at least one SCell. One SCG includes at least one PSCell, and may further include at least one SCell.

For example, the communications system in FIG. 1 may be a multi-carrier communications system, for example, a carrier aggregation (CA) scenario, a dual connectivity (DC) scenario. This is not limited in the embodiments of the present disclosure.

The network device 100 may be a base station, a core network device, a transmission and reception point (TRP), a relay station, an access point, or the like. The network device 100 may be a base transceiver station (BTS) in a global system for mobile communications (GSM) or a code division multiple access (CDMA) network, may be an NB (NodeB) in wideband code division multiple access (WCDMA), or may be an eNB or an eNodeB (evolved NodeB) in LTE. The network device 100 may be alternatively a wireless controller in a cloud radio access network (CRAN) scenario. The network device 100 may be alternatively a network device in the 5G communications system or a network device in a future evolved network. However, the term used does not constitute a limitation to the embodiments of the present disclosure.

The UE 200 may be wireless UE or wired UE. The wireless UE may be a device that provides voice and/or other service data connectivity for a user, a handheld device with a wireless communication function, a computing device, another processing device connected to a wireless modem, an in-vehicle device, a wearable device, UE in a future 5G network, UE in a future evolved PLMN network, or the like. The wireless UE may communicate with one or more core networks by using a radio access network (RAN). The wireless UE may be a mobile device such as a mobile phone (or referred to as a "cellular" phone) and a computer with a mobile device. For example, the wireless terminal device may be a portable, pocket-sized, handheld, computer built-in, or in-vehicle mobile apparatus that exchanges voice and/or data with a radio access network, and/or a device such as a personal communication service (PCS) phone, a cordless phone, a session initiation protocol (SIP) phone, a wireless local loop (WLL) station, or a personal digital assistant (PDA). The wireless UE may be alternatively a mobile device, a terminal device, an access terminal device, a wireless communications device, a terminal device unit, a terminal device station, a mobile station, a mobile console (Mobile), a remote station, a remote terminal, a subscriber unit, a subscriber station, a user agent, a terminal device apparatus, or the like. In an example, in this embodiment of this application, a mobile phone is shown as an example of the UE 200 in FIG. 1.

Currently, in a related technology, in a dual-connectivity mobility procedure, if the UE cannot switch a sending path of uplink data from a source cell to a target cell in time, sending of the uplink data may be interrupted or delayed.

To solve the foregoing technical problem, the embodiments of the present disclosure provide a path switching method and a device. UE switches a sending path of uplink data from a source cell to a target cell based on a first condition or a target uplink grant. According to the solution, in the dual-connectivity mobility procedure, the UE can switch the sending path of the uplink data in time in a case of successful switching, or when an SCG is changed successfully, or when random access of the target cell succeeds in a switching process, or when random access of the target cell succeeds in an SCG change process. In other words, the UE has switched the sending path of the uplink data from the source cell to the target cell when the UE needs to send the uplink data by using the target cell, and interruption or delaying of sending of the uplink data can be avoided. Alternatively, the UE switches the sending path of the uplink data based on the uplink grant that is used for the target cell and that is used by the MAC layer of the UE, when a predetermined condition (the switching succeeds, the SCG is changed successfully, the random access of the target cell succeeds in the switching process, or the random access of the target cell succeeds in the SCG change process) is met. In other words, the UE switches the sending path of the uplink data when the MAC layer of the UE uses the uplink grant. In this way, to some extent, the UE has switched the sending path of the uplink data from the source cell to the target cell when the UE needs to send the uplink data by using the target cell, and a probability of interruption or delaying of sending of the uplink data can be reduced.

The path switching method and device provided in the embodiments of the present disclosure are described in detail below with reference to the accompanying drawings by using specific embodiments and application scenarios thereof.

With reference to the foregoing content, an embodiment of the present disclosure provides a path switching method. As shown in FIG. 2, the path switching method may include the following step 201.

Step 201. UE switches a sending path of uplink data from a source cell to a target cell based on a first condition or a target uplink grant.

The first condition includes any one of the following: switching the sending path in a case of successful switching, switching the sending path when a secondary cell group SCG is changed successfully, switching the sending path when random access of the target cell succeeds in a switching process, and switching the sending path when random access of the target cell succeeds in an SCG change process. The target uplink grant is an uplink grant used by a MAC layer of the UE when the predetermined condition is met; and the predetermined condition includes any one of the following: the switching succeeds, the SCG is changed successfully, the random access of the target cell succeeds in the switching process, and the random access of the target cell succeeds in the SCG change process.

It may be understood that switching the sending path of the uplink data from the source cell to the target cell is switching the sending path of the uplink data from a source connection (or path) to a target connection (or path). The source connection (or path) is a connection (or path) between the UE and the source cell, and the target connection (or path) is a connection (or path) between the UE and the target cell.

It may be understood that the uplink grant is uplink grant information, and may be specifically indication information used to indicate a resource used to send the uplink data.

It should be noted that in this embodiment of the present disclosure, the target uplink grant is indication information used to indicate a resource used to send uplink data for the target cell, and is not indication information used to indicate a resource used to send uplink data for the source cell.

In this embodiment of the present disclosure, switching (namely, dual-connectivity switching) may be specifically switching a primary cell group (namely, a primary cell in the primary cell group) in dual connectivity.

In this embodiment of the present disclosure, SCG changing (namely, dual-connectivity SCG changing) may be specifically changing a secondary cell group (namely, a primary secondary cell in the secondary cell group) in dual connectivity.

In this embodiment of the present disclosure, random access may be contention-based random access, or may be non-contention-based random access. This may be specifically determined based on an actual use requirement, and is not limited in this embodiment of the present disclosure.

For example, a contention-based random access process may include the following four steps: Step 1: UE sends a random access preamble sequence (random access preamble) to a network device. Step 2: The network device sends a random access response to the UE. Step 3: The UE sends scheduled transmission to the network device. Step 4: The network devices sends contention resolution to the UE. A non-contention-based random access process may include the following two steps: Step 1: UE sends a random access preamble sequence to a network device. Step 2: The network device sends a random access response to the UE. This embodiment of the present disclosure may be further applicable to a contention-based random access process or a non-contention-based random access process in another form. This is not limited in this embodiment of the present disclosure.

In this embodiment of the present application, step 201 may be specifically implemented by using the following two possible implementations.

In a first possible implementation, step 201 may be specifically implemented by using the following step 301.

Step 301. The UE switches the sending path of the uplink data from the source cell to the target cell based on the first condition.

The first condition includes any one of the following: switching the sending path in the case of successful switching, switching the sending path when the SCG is changed successfully, switching the sending path when the random access of the target cell succeeds in the switching process, and switching the sending path when the random access of the target cell succeeds in the SCG change process.

For example, the UE switches the sending path of the uplink data from the source cell to the target cell in the case of a successful switching, when the SCG is changed successfully, when the random access of the target cell succeeds in the switching process, or when the random access of the target cell succeeds in the SCG change process.

In this embodiment of the present disclosure, in a dual-connectivity mobility procedure, the UE can switch the sending path of the uplink data in time in the case of successful switching, or when the SCG is changed successfully, or when the random access of the target cell succeeds in the switching process, or when the random access of the target cell succeeds in the SCG change process. In other words, the UE has switched the sending path of the uplink data from the source cell to the target cell when the UE needs to send the uplink data by using the target cell, and interruption or delaying of sending of the uplink data can be avoided.

In a second possible implementation, with reference to FIG. 2, as shown in FIG. 3, the foregoing step 201 may be specifically implemented by using the following step 401.

Step 401. The UE switches the sending path of the uplink data from the source cell to the target cell based on the target uplink grant.

The target uplink grant is an uplink grant that is used for the target cell and that is used by the MAC layer of the UE when the predetermined condition is met; and the predetermined condition includes any one of the following: the switching succeeds, the SCG is changed successfully, the random access of the target cell succeeds in the switching process, and the random access of the target cell succeeds in the SCG change process.

For example, the UE switches the sending path of the uplink data from the source cell to the target cell based on the uplink grant that is used for the target cell and that is used by the MAC layer of the UE (when or after the MAC layer of the UE uses the target uplink grant), in the case of successful switching, when the SCG is changed successfully, when the random access of the target cell succeeds in the switching process, or when the random access of the target cell succeeds in the SCG change process.

In this embodiment of the present disclosure, the UE can switch the sending path of the uplink data in time based on the uplink grant that is used for the target cell and that is used by the MAC layer of the UE, when the predetermined condition (the switching succeeds, the SCG is changed successfully, the random access of the target cell succeeds in the switching process, or the random access of the target cell succeeds in the SCG change process) is met. In other words, the UE switches the sending path of the uplink data when the MAC layer of the UE uses the uplink grant. In this way, to some extent, the UE has switched the sending path of the uplink data from the source cell to the target cell when the UE needs to send the uplink data by using the target cell, and interruption or delaying of sending of the uplink data can be avoided.

Optionally, before step 401, a target network device to which the target cell belongs sends configuration information to the UE.

For example, with reference to FIG. 3, as shown in FIG. 4, before step 401, the path switching method provided in this embodiment of the present disclosure may further include the following step 402.

Step 402. The target network device sends the configuration information to the UE.

The configuration information may be radio resource control (RRC) configuration information, or may be RRC reconfiguration information. This is not limited in this embodiment of the present disclosure.

In this embodiment of the present disclosure, in the configuration information, the target network device may configure, for the UE, at least one uplink grant (Configured Grant, CG) used for the target cell.

The target uplink grant may be an uplink grant configured by the target network device for the UE in the configuration information in the dual-connectivity mobility procedure. The target uplink grant may be alternatively an uplink grant sent by the target network device to the UE when the predetermined condition is met (for example, the uplink grant (Dynamic Grant, DG) dynamically scheduled by the target network device by using downlink control information (DCI)). This may be specifically determined based on an actual use requirement, and is not limited in this embodiment of the present disclosure.

It should be noted that the configured uplink grant may be in an available state (activated state), or an unavailable state (deactivated state). When the predetermined condition is met, after the UE receives the uplink grant that is sent by the target network device and that is in the unavailable state, the uplink grant in the unavailable state is activated and becomes an available uplink grant.

The UE receives the configuration information sent by the target network device, and the UE triggers the dual-connectivity mobility procedure based on the received configuration information, and establishes the connections to the source cell and the target cell at the same time. In the dual-connectivity mobility procedure, before the UE releases the connection to the source cell, the UE can send the uplink data in one of the source cell and the target cell at one moment. Therefore, the UE needs to switch the sending path of the uplink data in time.

For example, in the second possible implementation, step 401 may be specifically implemented by using the following step 401*a*.

Step 401*a*. The UE switches the sending path of the uplink data from the source cell to the target cell when the predetermined condition is met and when the MAC layer of the UE uses the target uplink grant.

In this embodiment of the present disclosure, the UE switches the sending path of the uplink data when the predetermined condition (the switching succeeds, the SCG is changed successfully, the random access of the target cell succeeds in the switching process, or the random access of the target cell succeeds in the SCG change process) is met and when the MAC layer of the UE uses the target uplink grant. In this way, the UE has switched the sending path of the uplink data from the source cell to the target cell when the UE needs to send the uplink data by using the target cell, and interruption or delaying of sending of the uplink data can be avoided.

Optionally, in the second possible implementation, the target uplink grant includes any one of the following: the first uplink grant that is used for the target cell and that is used by the MAC layer of the UE, an uplink grant that is used for the target cell and that corresponds to an earliest time of sending, by the UE, the uplink data, and the first uplink grant that is received by the UE and that is used for the target cell.

The following describes the path switching method in this embodiment of the present disclosure by using three possible cases.

In a possible case, the target uplink grant is the first uplink grant that is used for the target cell and that is used by the MAC layer of the UE.

For example, step 401 may be implemented by using the following step 401*b*.

Step 401*b*. The UE switches the sending path of the uplink data from the source cell to the target cell based on the first uplink grant that is used for the target cell and that is used by the MAC layer of the UE, when the predetermined condition is met.

It may be understood that when the predetermined condition is met, if the first uplink grant that is used for the target cell and that is used by the MAC layer of the UE is a configured uplink grant (briefly referred to as CG 1 below, where the CG 1 is in an available state (activated state)), the target uplink grant is the CG 1. When the predetermined condition is met, if the first uplink grant that is used for the target cell and that is used by the MAC layer of the UE is a dynamically scheduled uplink grant (briefly referred to as DG 1 below), the target uplink grant is the DG 1.

With reference to the foregoing step 401*a*, step 401*b* may be: The UE switches the sending path of the uplink data from the source cell to the target cell when the predetermined condition is met and when the MAC layer of the UE uses the first uplink grant used for the target cell. In other words, the MAC layer of the UE uses, as a time point at which the UE switches the sending path of the uplink data, a time point of the first uplink grant that is used for the target cell and that is used by the MAC layer of the UE.

In this embodiment of the present disclosure, the UE switches the sending path of the uplink data based on the first uplink grant that is used for the target cell and that is used by the MAC layer of the UE, when the predetermined condition is met. In this way, the UE has switched the sending path of the uplink data from the source cell to the target cell when the UE needs to send the uplink data by using the target cell, and a probability of interruption or delaying of sending of the uplink data can be reduced.

In a possible case, the target uplink grant is the uplink grant that is used for the target cell and that corresponds to the earliest time of sending, by the UE, the uplink data. In other words, the target uplink grant is the uplink grant that corresponds to the earliest time of sending, by the UE, the uplink data, in the uplink grant that is used for the target cell and that is used by the MAC layer of the UE.

For example, step 401 may be implemented by using the following step 401c.

Step 401c. The UE switches the sending path of the uplink data from the source cell to the target cell based on the uplink grant that is used by the MAC layer of the UE and that corresponds to the earliest time of sending, by the UE, the uplink data, when the predetermined condition is met.

It may be understood that in this embodiment of the present disclosure, the sending time is a time of sending, by a physical layer of the UE, the uplink data to the target network device by using the uplink grant.

It should be noted that when the MAC layer uses one uplink grant, the UE may learn of a sending time corresponding to the uplink grant.

It may be understood that when the predetermined condition is met, if the MAC layer of the UE uses a plurality of uplink grants (including at least one of the following: a configured uplink grant and a dynamically scheduled uplink grant) in a particular time, the target uplink grant is an uplink grant corresponding to the earliest time of sending, by the UE, the uplink data, in the plurality of uplink grants.

It should be noted that that the MAC layer uses the plurality of uplink grants in the particular time may be that the MAC layer uses the plurality of uplink grants at a same moment in a case of parallel transmission; or may be that the MAC layer uses the plurality of uplink grants at different moments in a case of serial transmission, or may be another case. This is not limited in this embodiment of the present disclosure. When the MAC layer uses the plurality of uplink grants at different moments, the MAC layer may determine to use the plurality of uplink grants at a same moment. However, due to the serial transmission, the MAC layer determines, based on a particular rule (based on an actual use requirement), a sequence or times of using the plurality of uplink grants.

For example, when the predetermined condition is met, if the MAC layer of the UE uses two uplink grants, namely, a CG 2 and a DG 2, in a particular time, regardless of a sequence of using, by the MAC layer, the CG 2 and the DG 2, if a sending time of the CG 2 is earlier than that of the DG 2, the target uplink grant is the CG 2, or if a sending time of the DG 2 is earlier than that of the CG 2, the target uplink grant is the DG 2.

Optionally, with reference to the foregoing step 401a, step 401b may be: The UE switches the sending path of the uplink data from the source cell to the target cell when the predetermined condition is met and when the MAC layer of the UE uses the uplink grant that is used for the target cell and that corresponds to the earliest time of sending, by the UE, the uplink data. In other words, the MAC layer of the UE uses, as a time point at which the UE switches the sending path of the uplink data, a time point of the uplink grant that is used for the target cell and that corresponds to the earliest time of sending, by the UE, the uplink data.

In this embodiment of the present disclosure, the UE switches the sending path of the uplink data based on the uplink grant that is used by the MAC layer of the UE and that corresponds to the earliest time of sending, by the UE, the uplink data, when the predetermined condition is met. In this way, the UE has switched the sending path of the uplink data from the source cell to the target cell when the UE needs to send the uplink data by using the target cell, and a probability of interruption or delaying of sending of the uplink data can be reduced.

In a possible case, the target uplink grant is the first uplink grant that is received by the UE and that is used for the target cell. In other words, the target uplink grant is the first uplink grant received by the UE in the uplink grant that is used for the target cell and that is used by the MAC layer of the UE.

For example, step 401 may be specifically implemented by using the following step 401d.

Step 401d. The UE switches the sending path of the uplink data from the source cell to the target cell based on the first uplink grant that is received by the UE, that is used for the target cell, and that is used by the MAC layer of the UE, when the predetermined condition is met.

It may be understood that the first uplink grant that is received by the UE and that is used for the target cell may be a configured uplink grant in an unavailable state.

For example, when the predetermined condition is met, if the MAC layer of the UE uses the first uplink grant (briefly referred to as DG 3 below) that is received by the UE and that is used for the target cell, the target uplink grant is the DG 3.

Optionally, with reference to the foregoing step 401a, step 401b may be: The UE switches the sending path of the uplink data from the source cell to the target cell when the predetermined condition is met and when the MAC layer of the UE uses the first uplink grant that is received by the UE and that is used for the target cell. In other words, the MAC layer of the UE uses, as a time point at which the UE switches the sending path of the uplink data, a time point of the first uplink grant that is received by the UE and that is used for the target cell.

In this embodiment of the present disclosure, the UE switches the sending path of the uplink data based on the first uplink grant that is received by the UE, that is used for the target cell, and that is used by the MAC layer of the UE, when the predetermined condition is met. In this way, the UE has switched the sending path of the uplink data from the source cell to the target cell when the UE needs to send the uplink data by using the target cell, and a probability of interruption or delaying of sending of the uplink data can be reduced.

Optionally, with reference to FIG. 3, as shown in FIG. 5, before step 401, the path switching method provided in this embodiment of the present disclosure may further include the following step 403 and step 404.

Step 403. In a random access process of the target cell, the target network device sends the target uplink grant to the UE.

The target uplink grant is the uplink grant used by the MAC layer of the UE when the predetermined condition is met; and the predetermined condition includes any one of the following: the switching succeeds, the secondary cell group SCG is changed successfully, the random access succeeds in the switching process, and the random access succeeds in the SCG change process. The target uplink grant is used to switch the sending path of the uplink data.

For description of the target uplink grant, refer to related description of step 401. Details are not described herein again.

Step 404. In the random access process of the target cell, the UE receives the target uplink grant from the target network device.

The random access is the random access of the target cell in the switching or SCG changing process in the dual-connectivity mobility procedure.

Optionally, the random access is contention-based four-step random access, and the target uplink grant is an uplink grant transmitted in the fourth step (Msg4) in the random access process.

For example, step 403 may be specifically implemented by using the following step 403a, step 404 may be specifically implemented by using the following step 404a, and step 401 may be specifically implemented by using the following step 401e.

Step 403a. In the fourth step of the contention-based four-step random access process, the target network device sends the target uplink grant to the UE.

For example, in the Msg4 of the contention-based four-step random access process, the target network device delivers the target uplink grant (Uplink Grant) by using a media access control-control element (MAC-CE) command.

Step 404a. In the fourth step of the contention-based four-step random access process, the UE receives the target uplink grant sent by the target network device.

Step 401e. The UE switches the sending path of the uplink data from the source cell to the target cell based on the target uplink grant in a case of contention resolution.

Contention resolution is that the contention-based four-step random access succeeds.

In this embodiment of the present disclosure, the solution of delivering the target uplink grant by using the Msg4 in the contention-based four-step random access process is provided, to further reduce a probability of interruption or delaying of sending of the uplink data.

In this embodiment of the present disclosure, in the dual-connectivity mobility procedure, the target network device sends the target uplink grant (the uplink grant used by the MAC layer of the UE when the predetermined condition is met; used to switch the sending path of the uplink data) to the UE in the random access process, so that the UE can switch the sending path of the uplink data in time by using the target uplink grant in the dual-connectivity mobility procedure, to reduce a probability of interruption or delaying of sending of the uplink data.

Optionally, when the UE switches the sending path of the uplink data from the source cell to the target cell or after the UE switches the sending path of the uplink data from the source cell to the target cell, the UE may send, to a source network device to which the source cell belongs, first indication information used to indicate that the sending path of the uplink data has been switched.

Figure 6:
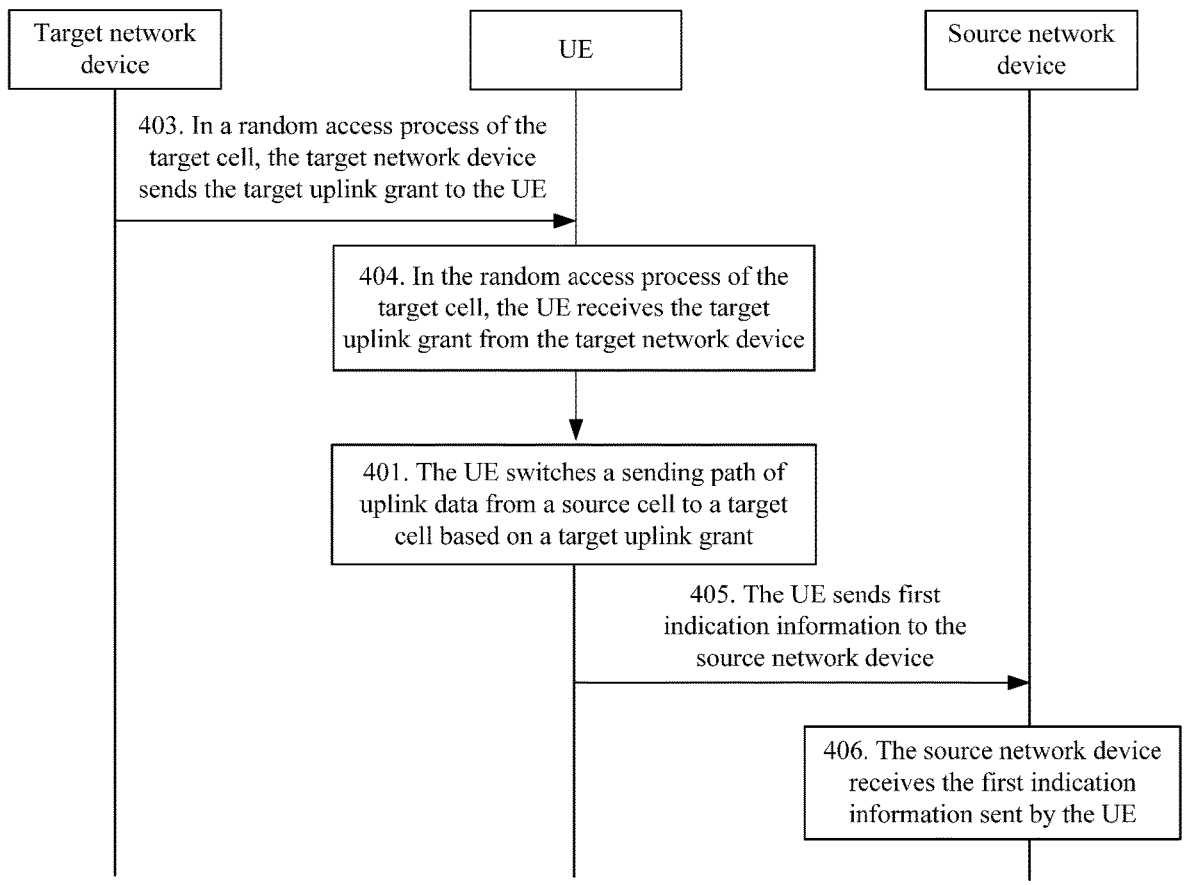
FIG. 6 is a fifth flowchart of a path switching method according to an embodiment of the present disclosure.

For example, with reference to FIG. 5, as shown in FIG. 6, after step 401, the path switching method provided in this embodiment of the present disclosure may further include the following step 405 and step 406.

Step 405. The UE sends the first indication information to the source network device.

The target indication information is used to indicate that the sending path of the uplink data has been switched from the source cell to the target cell.

Step 406. The source network device receives the first indication information sent by the UE.

It should be noted that in this embodiment of the present disclosure, a sequence of performing step 401, and two steps of step 405 and step 406 is not limited. For example, step 401 may be performed first, and then step 405 and step 406 are performed. Alternatively, step 401, and two steps of step 405 and step 406 may be performed at the same time. This may be specifically determined based on an actual use requirement.

In this embodiment of the present disclosure, after the UE sends the first indication information to the source network device, the source network device may learn in time that the UE has switched the sending path of the uplink data from the source cell to the target cell. In this way, on one hand, the source network device does not need to send a dynamically scheduled uplink grant to the UE to avoid interruption or delaying of sending of the uplink data. On the other hand, the source network device no longer sends the scheduled uplink grant to the UE. Then, the source network device no longer receives the uplink data sent by the UE. Only the target network device sends the dynamically scheduled uplink grant to the UE, and receives the uplink data sent by the UE, so that the target network device can send the uplink data to a core network device in sequence, to ensure a sequence of the uplink data sent to the core network device.

Optionally, in this embodiment of the present disclosure, the target network device may alternatively send, to the source network device to which the source cell belongs, target indication information used to indicate that the sending path of the uplink data has been switched.

Figure 7:
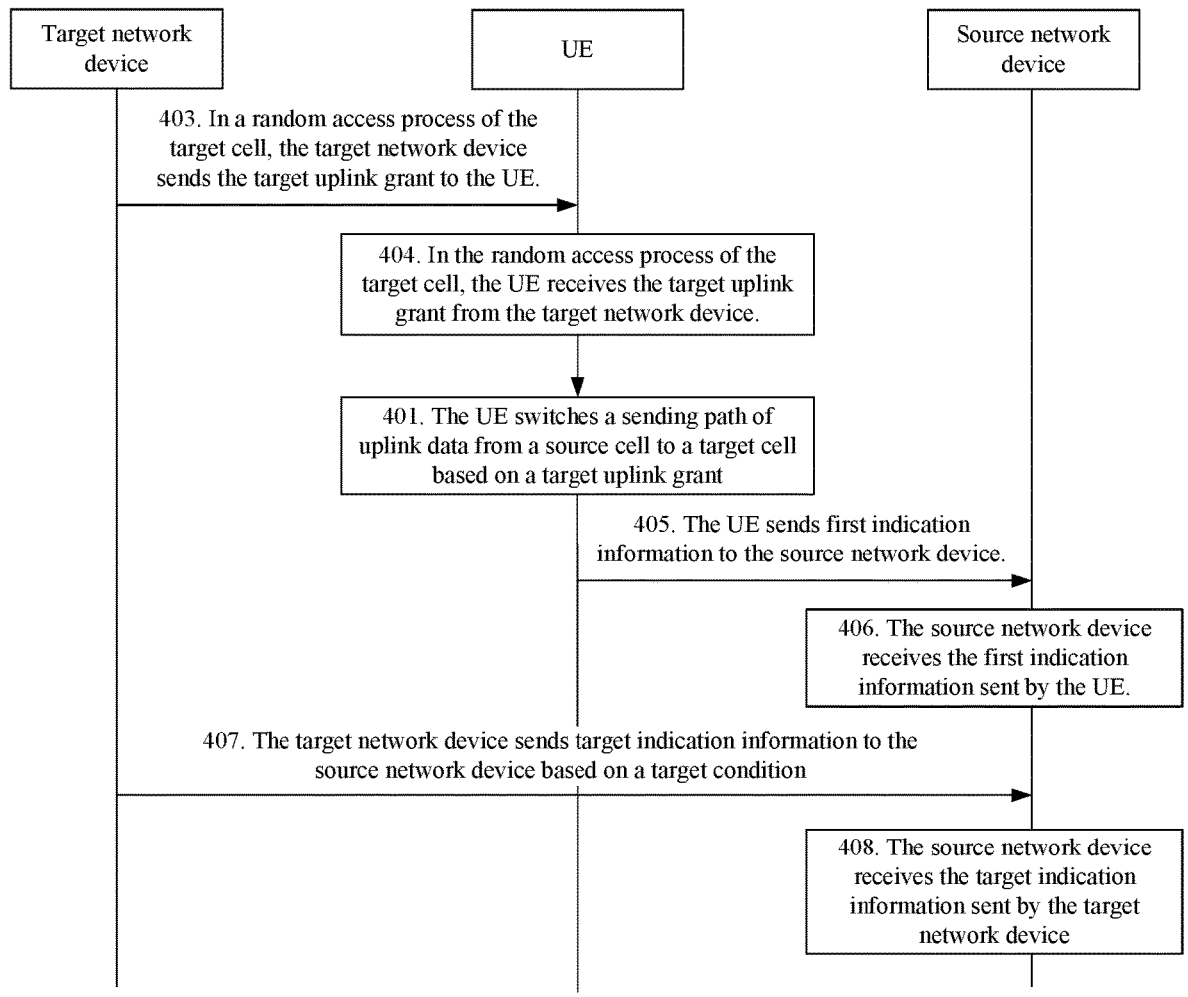
FIG. 7 is a sixth flowchart of a path switching method according to an embodiment of the present disclosure.

For example, with reference to FIG. 6, as shown in FIG. 7, the path switching method provided in this embodiment of the present disclosure may further include the following step 407 and step 408.

Step 407. The target network device sends the target indication information to the source network device based on a target condition.

The target indication information is used to indicate that UE has switched the sending path of the uplink data from the source cell to the target cell. The target condition includes any one of the following: performing sending when the target network device receives uplink data that is sent by the UE by using the target cell, performing sending when the predetermined condition is met, and performing sending when the predetermined condition is met and the target network device sends the first uplink grant used for the target cell to the UE. The predetermined condition includes any one of the following: the switching succeeds, the SCG is changed successfully, the random access of the target cell succeeds in the switching process, and the random access of the target cell succeeds in the SCG change process.

Step 407 may specifically include, but not limited to, the following three cases:

In case 1, when the target network device receives the uplink data that is sent by the UE by using the target cell, the target network device sends the target indication information to the source network device.

In case 2, when the switching succeeds, the SCG is changed successfully, the random access of the target cell succeeds in the switching process, or the random access of the target cell succeeds in the SCG change process, the target network device sends the target indication information to the source network device.

In case 3, the target network device sends the target indication information to the source network device in the case of successful switching, when the SCG is changed successfully, when the random access of the target cell succeeds in the switching process, or when the random access of the target cell succeeds in the SCG change process, and when the target network device sends the first uplink grant used for the target cell to the UE.

Optionally, the target condition may further include: performing sending when the target network device receives second indication information sent by the UE, where the second indication information is used to indicate that UE has switched the sending path of the uplink data from the source cell to the target cell. The UE sends the second indication information to the target network device when the UE switches the sending path of the uplink data from the source cell to the target cell or after the UE switches the sending path of the uplink data from the source cell to the target cell.

It may be understood that step 407 may further include the following case 4:

In case 4, when the target network device receives the second indication information sent by the UE, the target network device sends the target indication information to the source network device.

Step 408. The source network device receives the target indication information sent by the target network device.

In this embodiment of the present disclosure, in the dual-connectivity mobility procedure, the target network device sends the target indication information to the source network device based on the target condition, so that after receiving the target indication information, the source network device can learn in time that the UE has switched the sending path of the uplink data and the source network device does not need to re-send the dynamically scheduled uplink grant to the UE to avoid interruption or delaying of sending of the uplink data.

It should be noted that a sequence of performing two steps of step 405 and step 406, and performing two steps of step 407 and step 408 is not limited in this embodiment of the present disclosure. For example, two steps of step 405 and step 406 may be performed first, and then two steps of step 407 and step 408 are performed. Alternatively, two steps of step 407 and step 408 may be performed first, and then two steps of step 405 and step 406 are performed. Alternatively, two steps of step 405 and step 406 and two steps of step 407 and step 408 may be performed at the same time. In addition, in this embodiment of the present disclosure, only the foregoing step 405 and step 406 may be included, or only the foregoing step 407 and step 408 may be included. This may be specifically determined based on an actual use requirement, and is not limited in this embodiment of the present disclosure.

It should be noted that each of the accompanying drawings in the embodiments of the present disclosure is exemplified in combination with the accompanying drawings of embodiments of independent claims. In a specific implementation, each of the accompanying drawings can also be implemented in combination with any other accompanying drawings. This is not limited in the embodiments of the present disclosure. For example, with reference to FIG. 3, after step 401, the path switching method provided in this embodiment of the present disclosure may further include step 405 and step 406. Alternatively, with reference to FIG. 4, after step 401, the path switching method provided in this embodiment of the present disclosure may further include step 405 and step 406.

It should be noted that in this embodiment of the present disclosure, the uplink data may be uplink data of all types in the related technology, or may be predefined uplink data of some types. This may be specifically determined based on an actual use requirement, and is not limited in this embodiment of the present disclosure.

In this embodiment of the present disclosure, a type of uplink data that the target cell can send (or that the source cell cannot send) after the sending path of the uplink data is switched, or a type of uplink data that the source cell can send (or the target cell cannot send) before the sending path of the uplink data is switched includes any one of the following: a PDCP (Packet Data Convergence Protocol) layer data packet, a PDCP layer control packet, and PDCP layer data. The PDCP layer data packet may be a PDCP Data PDU, the PDCP layer control packet may be a PDCP control PDU, and the PDCP layer data may be a PDCP PDU. For example, the PDCP layer data (for example, the PDCP PDU) includes, but not limited to: an SRB control packet, an SRB data packet, a DRB control packet, a DRB data packet, a PDCP control packet, and a PDCP data packet.

In an example, the type of uplink data that the target cell can send (or that the source cell cannot send) after the sending path of the uplink data is switched, or the type of uplink data that the source cell can send (or the target cell cannot send) before the sending path of the uplink data is switched includes any one of the following: a PDCP layer data packet of a data bearer, a PDCP layer control packet of a data bearer, and PDCP layer data of a data bearer.

In example 1, the target connection or the source connection is a connection that cannot be used to send uplink data. Then, the UE cannot send an uplink PDCP Data PDU on the target connection or the source connection.

In example 2, the target connection or the source connection is a connection that cannot be used to send uplink data. Then, the UE cannot send a PDCP PDU of an uplink DRB on the target connection or the source connection.

In example 3, the target connection or the source connection is a connection that cannot be used to send uplink data. Then, the UE cannot send a PDCP Data PDU of an uplink DRB on the target connection or the source connection.

In this embodiment of the present disclosure, for switching of the sending path of the uplink data, one PDCP entity of the UE is associated with two RLC (Radio Link Control) entities, where one source RLC entity is associated with a sending path of the source cell, and one target RLC is associated with a sending path of the target cell. Before the UE switches the sending path of the uplink data, the PDCP entity may send, to the source RLC entity, uplink data that can be sent, and the PDCP entity does not send, to the target RLC entity, the uplink data that cannot be sent. After the UE switches the sending path of the uplink data, the PDCP entity does not send, to the source RLC entity, uplink data that cannot be sent, and the PDCP entity sends, to the target RLC entity, the uplink data that can be sent.

Figure 8:
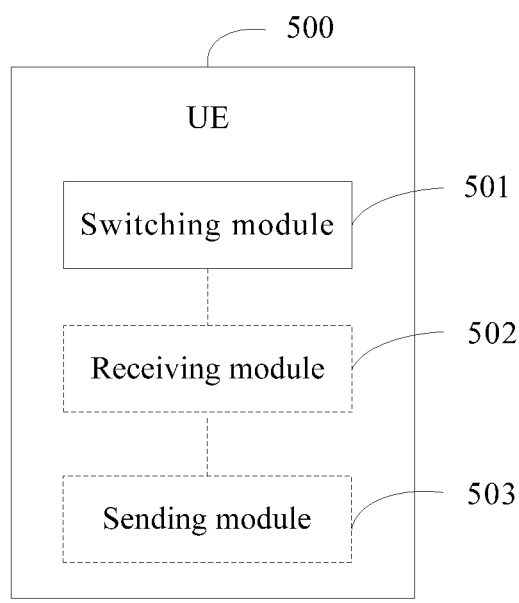
FIG. 8 is a first schematic structural diagram of UE according to an embodiment of the present disclosure.

As shown in FIG. 8, an embodiment of the present disclosure provides UE 500. The UE 500 includes a switching module 501, configured to switch a sending path of uplink data from a source cell to a target cell based on a first condition or a target uplink grant, where the first condition includes any one of the following: switching the sending path in a case of successful switching, switching the sending path when a secondary cell group SCG is changed successfully, switching the sending path when random access of the target cell succeeds in a switching process, and switching the sending path when random access of the target cell succeeds in an SCG change process; the target uplink grant is an uplink grant that is used for the target cell and that is used by a MAC layer of the UE when a predetermined condition is met; and the predetermined condition includes any one of the following: the switching succeeds, the SCG is changed successfully, the random access of the target cell succeeds in the switching process, and the random access of the target cell succeeds in the SCG change process.

Optionally, the switching module 501 is specifically configured to switch the sending path of the uplink data from the source cell to the target cell when the MAC layer of the UE uses the target uplink grant.

Optionally, the target uplink grant includes any one of the following: the first uplink grant that is used for the target cell and that is used by the MAC layer of the UE, an uplink grant that is used for the target cell and that corresponds to an earliest time of sending, by the UE, the uplink data, and the first uplink grant that is received by the UE and that is used for the target cell.

Optionally, the UE 500 further includes a receiving module 502. The receiving module 502 is configured to: before the switching module 501 switches the sending path of the uplink data from the source cell to the target cell based on the target uplink grant, receive, in a random access process of the target cell, the target uplink grant from a target network device to which the target cell belongs.

Optionally, the random access process is a contention-based four-step random access process, and the target uplink grant is an uplink grant transmitted in the fourth step in the random access process. The switching module 501 is specifically configured to switch the sending path of the uplink data from the source cell to the target cell based on the target uplink grant in a case of contention resolution.

Optionally, the UE 500 further includes a sending module 503. The sending module 503 is configured to send target indication information to a source network device to which the source cell belongs, where the target indication information is used to indicate that the sending path of the uplink data has been switched from the source cell to the target cell.

It should be noted that as shown in FIG. 8, the module that is necessarily included in the UE 500 is shown by a solid box, for example, the switching module 501. Modules that may be or may not be included in the UE 500 are shown by dashed boxes, for example, the receiving module 502 and the sending module 503.

The UE provided in this embodiment of the present disclosure can implement various processes in the foregoing embodiment. To avoid repetition, details are not described herein again.

The UE provided in this embodiment of the present disclosure switches the sending path of the uplink data from the source cell to the target cell based on the first condition or the target uplink grant. According to the solution, in a dual-connectivity mobility procedure, the UE can switch the sending path of the uplink data from the source cell to the target cell in time (briefly referred to as the switching of the sending path of the uplink data below) in the case of successful switching, or when the SCG is changed successfully, or when the random access of the target cell succeeds in the switching process, or when the random access of the target cell succeeds in the SCG change process. In other words, the UE has switched the sending path of the uplink data from the source cell to the target cell when the UE needs to send the uplink data by using the target cell, and interruption or delaying of sending of the uplink data can be avoided. Alternatively, the UE switches the sending path of the uplink data based on the uplink grant that is used for the target cell and that is used by the MAC layer of the UE, when the predetermined condition (the switching succeeds, the SCG is changed successfully, the random access of the target cell succeeds in the switching process, or the random access of the target cell succeeds in the SCG change process) is met. In other words, the UE switches the sending path of the uplink data when the MAC layer of the UE uses the uplink grant. In this way, to some extent, the UE has switched the sending path of the uplink data from the source cell to the target cell when the UE needs to send the uplink data by using the target cell, and a probability of interruption or delaying of sending of the uplink data can be reduced.

Figure 9:
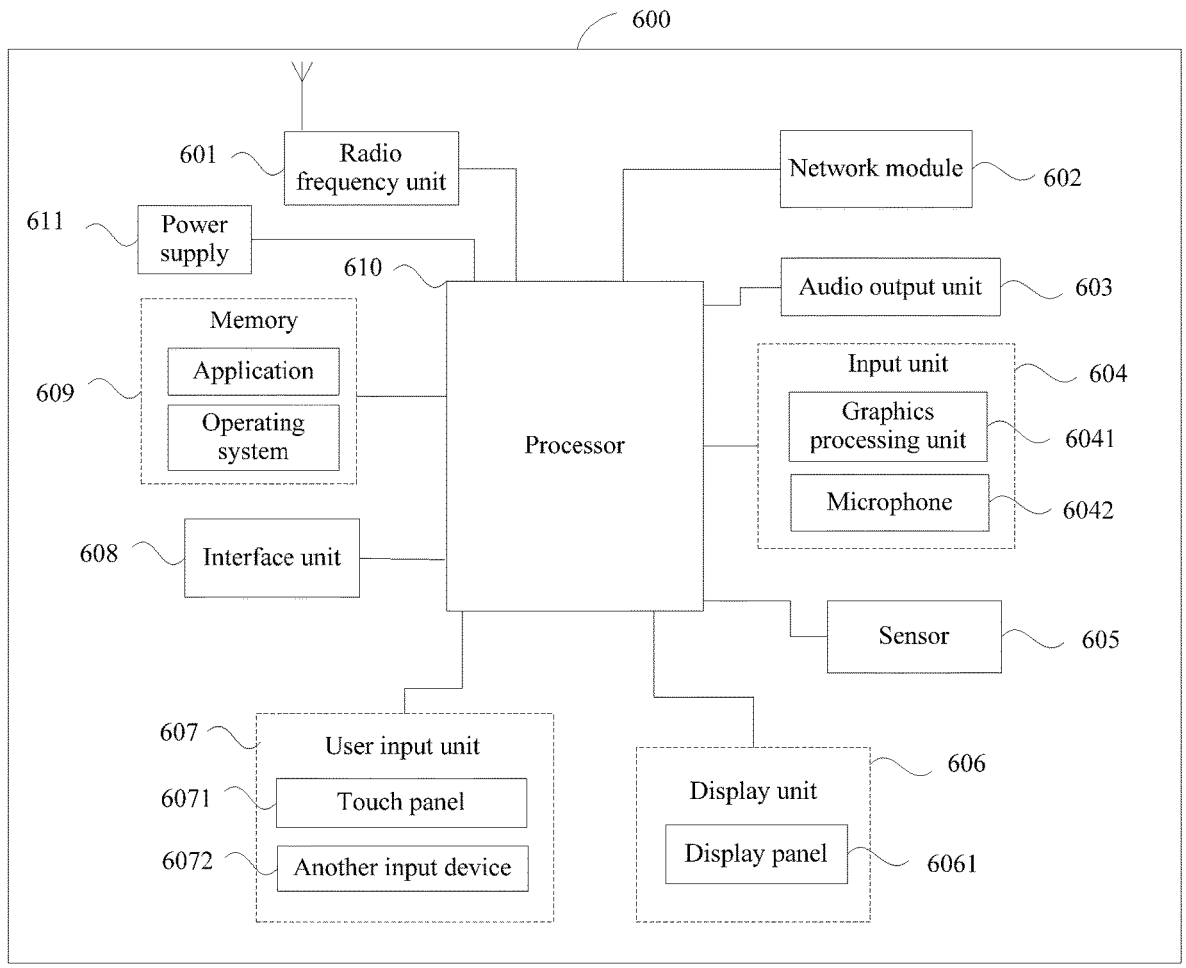
FIG. 9 is a second schematic diagram of hardware of UE according to an embodiment of the present disclosure.

FIG. 9 is a schematic diagram of a hardware structure of UE according to an embodiment of the present disclosure. The UE 600 includes, but not limited to: a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the UE 600 shown in FIG. 9 does not constitute any limitation on the UE, and the UE 600 may include more or fewer components than those shown in the figure, or some components may be combined, or a different component deployment may be used. In this embodiment of the present disclosure, the UE 600 includes, but not limited to: a mobile phone, a tablet computer, a notebook computer, a palmtop computer, a vehicle-mounted UE, a wearable device, and a pedometer.

The processor 610 is configured to switch a sending path of uplink data from a source cell to a target cell based on a first condition or a target uplink grant, where the first condition includes any one of the following: switching the sending path in a case of successful switching, switching the sending path when a secondary cell group SCG is changed successfully, switching the sending path when random access of the target cell succeeds in a switching process, and switching the sending path when random access of the target cell succeeds in an SCG change process; the target uplink grant is an uplink grant that is used for the target cell and that is used by a MAC layer of the UE when a predetermined condition is met; and the predetermined condition includes any one of the following: the switching succeeds, the SCG is changed successfully, the random access of the target cell succeeds in the switching process, and the random access of the target cell succeeds in the SCG change process.

The UE provided in this embodiment of the present disclosure switches the sending path of the uplink data from the source cell to the target cell based on the first condition or the target uplink grant. According to the solution, in a dual-connectivity mobility procedure, the UE can switch the sending path of the uplink data from the source cell to the target cell in time (briefly referred to as switching of the sending path of the uplink data below) in the case of successful switching, or when the SCG is changed successfully, or when the random access of the target cell succeeds in the switching process, or when the random access of the target cell succeeds in the SCG change process. In other words, the UE has switched the sending path of the uplink data from the source cell to the target cell when the UE needs to send the uplink data by using the target cell, and interruption or delaying of sending of the uplink data can be avoided. Alternatively, the UE switches the sending path of the uplink data based on the uplink grant that is used for the target cell and that is used by the MAC layer of the UE, when the predetermined condition (the switching succeeds, the SCG is changed successfully, the random access of the target cell succeeds in the switching process, or the random access of the target cell succeeds in the SCG change process) is met. In other words, the UE switches the sending path of the uplink data when the MAC layer of the UE uses the uplink grant. In this way, to some extent, the UE has switched the sending path of the uplink data from the source cell to the target cell when the UE needs to send the uplink data by using the target cell, and a probability of interruption or delaying of sending of the uplink data can be reduced.

It should be understood that in this embodiment of the present disclosure, the radio frequency unit 601 may be configured to receive and send signals in an information receiving and sending process or a calling process. Specifically, after receiving downlink data from a base station, the radio frequency unit 601 sends the downlink data to the processor 610 for processing, and sends uplink data to the base station. Usually, the radio frequency unit 601 includes, but not limited to: an antenna, at least one amplifier, a transceiver, a coupler, a low noise amplifier, and a duplexer. In addition, the radio frequency unit 601 may further communicate with another device by using a wireless communications system and a network.

The UE 600 provides the user with wireless broadband Internet access by using the network module 602, for example, helps the user send or receive an email, browse a web page, and access streaming media.

The audio output unit 603 may convert audio data received by the radio frequency unit 601 or the network module 602 or stored in the memory 609 into an audio signal, and output the audio signal into sound. In addition, the audio output unit 603 may also provide audio output (for example, call signal receiving sound or message receiving sound) related to a specific function performed by the UE 600. The audio output unit 603 includes a loudspeaker, a buzzer, a receiver, and the like.

The input unit 604 is configured to receive audio or video signals. The input unit 604 may include a graphics processing unit (GPU) 6041 and a microphone 6042. The graphics processing unit 6041 is configured to process image data of a static picture or a video obtained by an image capture apparatus (for example, a camera) in video capture mode or image capture mode. A processed image frame may be displayed on the display unit 606. The image frame processed by the graphics processing unit 6041 may be stored in the memory 609 (or another storage medium) or sent by using the radio frequency unit 601 or the network module 602. The microphone 6042 may receive sound and can process the sound into audio data. Processed audio data may be converted, in a call mode, into a format that can be sent to a mobile communication base station by using the radio frequency unit 601 for output.

The UE 600 further includes at least one sensor 605, for example, a light sensor, a motion sensor, and another sensor. Specifically, the light sensor includes an ambient light sensor and a proximity sensor. The ambient light sensor may adjust luminance of the display panel 6061 based on brightness of ambient light. The proximity sensor may turn off the display panel 6061 and/or backlight when the UE 600 is moved to an ear. As a motion sensor, an accelerometer sensor may detect magnitude of acceleration in various directions (usually three axes), may detect magnitude and the direction of gravity when stationary, may be configured to identify UE postures (such as horizontal and vertical orientation switch, related games, and magnetometer posture calibration), may perform functions related to vibration identification (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 may be configured to display information entered by a user or information provided for the user. The display unit 606 may include the display panel 6061, and the display panel 6061 may be configured in a form of a liquid crystal display (LCD), an organic light-emitting diode (OLED), or the like.

The user input unit 607 may be configured to receive input digit or character information, and generate a key signal input related to a user setting and function control of the UE 600. Specifically, the user input unit 607 includes a touch panel 6071 and another input device 6072. The touch panel 6071, also referred to as a touch screen, can collect a touch operation of the user on or near the touch panel 6071 (for example, an operation performed by the user on or near the touch panel 6071 by using any suitable object or accessory such as a finger or a stylus). The touch panel 6071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 610, and receives and executes a command sent by the processor 610. In addition, the touch panel 6071 may be of a resistive type, a capacitive type, an infrared type, a surface acoustic wave type, or the like. In addition to the touch panel 6071, the user input unit 607 may further include the another input device 6072. Specifically, the another input device 6072 may include, but not limited to, a physical keyboard, a function key (for example, a volume control key or a switch key), a trackball, a mouse, and a joystick. Details are not described herein.

Further, the touch panel 6071 may cover the display panel 6061. When detecting the touch operation on or near the touch panel 6071, the touch panel 6071 transmits the touch operation to the processor 610 to determine a type of a touch event, and then the processor 610 provides corresponding visual output on the display panel 6061 based on the type of the touch event. In FIG. 9, although the touch panel 6071 and the display panel 6061 are used as two independent parts to implement input and output functions of the UE 600, in some embodiments, the touch panel 6071 and the display panel 6061 may be integrated to implement the input and output functions of the UE 600. This is not specifically limited herein.

The interface unit 608 is an interface for connecting an external apparatus to the UE 600. For example, the external apparatus may include a wired or wireless headset port, an external power supply (or a battery charger) port, a wired or wireless data port, a storage card port, a port used to connect to an apparatus having an identity module, an audio input/output (I/O) port, a video I/O port, a headset port, and the like. The interface unit 608 may be configured to receive an input (for example, data information and power) from the external apparatus and transmit the received input to one or more elements in the UE 600, or transmit data between the UE 600 and the external apparatus.

The memory 609 may be configured to store software programs and various data. The memory 609 may mainly include a program storage area and a data storage area. The program storage area may store an operating system, an application required by at least one function (for example, a sound playback function and an image playback function), and the like. The data storage area may store data (for example, audio data and an address book) created based on the use of the mobile phone, and the like. In addition, the memory 609 may include a high-speed random access memory or a nonvolatile memory, for example, at least one disk storage device, a flash memory, or another volatile solid-state storage device.

The processor 610 is a control center of the UE 600, and connects all parts of the entire UE 600 by using various interfaces and lines. By running or executing a software program and/or a module stored in the memory 609 and invoking data stored in the memory 609, the processor 610 performs various functions and/or data processing of the UE 600, to perform overall monitoring on the UE 600. The processor 610 may include one or more processing units. Optionally, the processor 610 may be integrated with an application processor and a modem processor. The application processor mainly processes the operating system, the user interface, and applications. The modem processor mainly processes wireless communication. It may be understood that the modem processor may not be integrated into the processor 610.

The UE 600 may further include the power supply 611 (for example, a battery) supplying power to each component. Optionally, the power supply 611 may be logically connected to the processor 610 by using a power management system, so that functions such as charge and discharge management and power consumption management are implemented by using the power management system.

In addition, the UE 600 includes some function modules not shown. Details are not described herein.

Optionally, this embodiment of the present disclosure further provides UE, including the processor 610 and the memory 609 shown in FIG. 9, and a computer program that is stored in the memory 609 and that is capable of being executed by the processor 610. When the computer program is executed by the processor 610, the processes of the foregoing method embodiment are implemented, and a same technical effect can be achieved. To avoid repetition, details are not described herein again.

Figure 10:
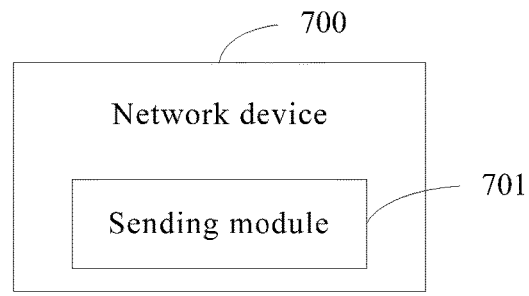
FIG. 10 is a first schematic structural diagram of a network device according to an embodiment of the present disclosure.

FIG. 10 is a schematic diagram of a hardware structure of a network device according to an embodiment of the present disclosure. The network device 700 is a target network device to which a target cell belongs. The network device 700 includes a sending module 701. The sending module 701 is configured to send a target uplink grant to UE in a random access process of the target cell, where the target uplink grant is an uplink grant used by a MAC layer of the UE when a predetermined condition is met; and the predetermined condition includes any one of the following: switching succeeds, a secondary cell group SCG is changed successfully, the random access succeeds in a switching process, and the random access succeeds in an SCG change process; and the target uplink grant is used to switch a sending path of uplink data.

Optionally, the random access is contention-based four-step random access, and the target uplink grant is an uplink grant transmitted in the fourth step in the random access process.

The network device provided in this embodiment of the present disclosure can implement various processes in the foregoing embodiment. To avoid repetition, details are not described herein again.

According to the network device provided in this embodiment of the present disclosure, the target network device to which the target cell belongs sends the target uplink grant to the UE in the random access process of the target cell, where the target uplink grant is the uplink grant used by the MAC layer of the UE when the predetermined condition is met; and the predetermined condition includes any one of the following: the switching succeeds, the secondary cell group SCG is changed successfully, the random access succeeds in the switching process, and the random access succeeds in the SCG change process; and the target uplink grant is used to switch the sending path of the uplink data. According to the solution, in a dual-connectivity mobility procedure, the target network device sends the target uplink grant (the uplink grant used by the MAC layer of the UE when the predetermined condition is met; used to switch the sending path of the uplink data) to the UE in the random access process, so that the UE can switch the sending path of the uplink data in time by using the target uplink grant in the dual-connectivity mobility procedure, to reduce a probability of interruption or delaying of sending of the uplink data.

FIG. 10 is a schematic diagram of a hardware structure of a network device according to an embodiment of the present disclosure. The network device 700 is a target network device to which a target cell belongs. The network device 700 includes the sending module 701. The sending module 701 is configured to send, based on a target condition, target indication information to a source network device to which a source cell belongs, where the target indication information is used to indicate that UE has switched the sending path of the uplink data from the source cell to the target cell; the target condition includes any one of the following: performing sending when the target network device receives uplink data that is sent by the UE by using the target cell, performing sending when the predetermined condition is met, and performing sending when the predetermined condition is met and the target network device sends the first uplink grant used for the target cell to the UE; and the predetermined condition includes any one of the following: the switching succeeds, the SCG is changed successfully, the random access of the target cell succeeds in the switching process, and the random access of the target cell succeeds in the SCG change process.

The network device provided in this embodiment of the present disclosure can implement various processes in the foregoing embodiment. To avoid repetition, details are not described herein again.

According to the network device provided in this embodiment of the present disclosure, the target network device to which the target cell belongs sends, based on the target condition, the target indication information to the source network device to which the source cell belongs, where the target indication information is used to indicate that UE has switched the sending path of the uplink data from the source cell to the target cell. According to the solution, in the dual-connectivity mobility procedure, the target network device sends the target indication information to the source network device, so that after receiving the target indication information, the source network device can learn in time that the UE has switched the sending path of the uplink data and the source network device does not need to re-send the dynamically scheduled uplink grant to the UE, to avoid interruption or delaying of sending of the uplink data.

Figure 11:
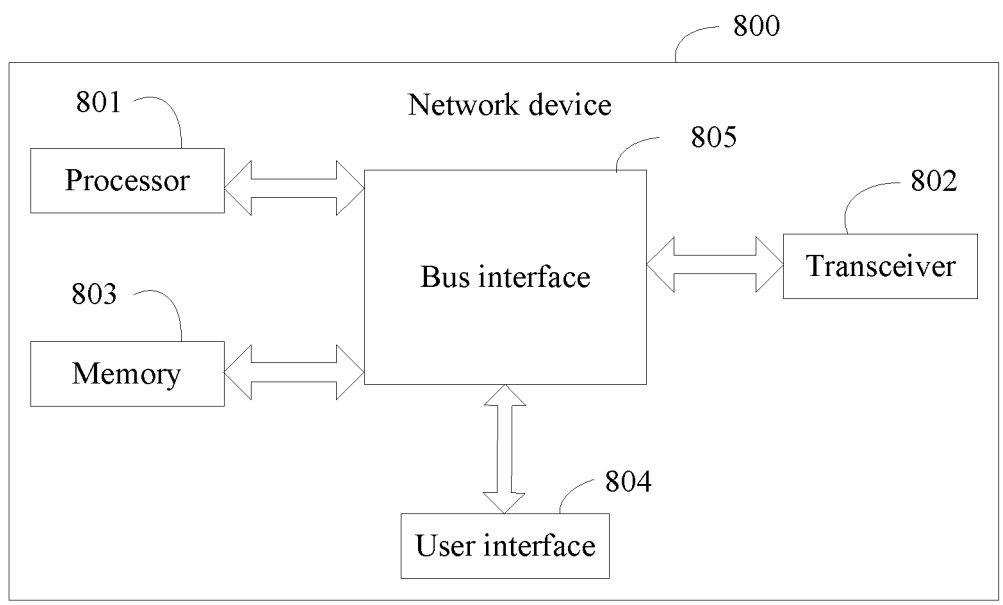
FIG. 11 is a second schematic structural diagram of hardware of a network device according to an embodiment of the present disclosure.

FIG. 11 is a schematic diagram of a hardware structure of a network device for implementing the embodiments of the present disclosure. The network device 800 is a target network device to which a target cell belongs. The network device 800 includes a processor 801, a transceiver 802, a memory 803, a user interface 804, and a bus interface 805.

In a case, the transceiver 802 is configured to send a target uplink grant to UE in a random access process of the target cell, where the target uplink grant is an uplink grant used by the MAC layer of the UE when a predetermined condition is met; and the predetermined condition includes any one of the following: switching succeeds, a secondary cell group SCG is changed successfully, the random access of the target cell succeeds in a switching process, and the random access of the target cell succeeds in an SCG change process; and the target uplink grant is used to switch a sending path of uplink data.

According to the network device provided in this embodiment of the present disclosure, the target network device to which the target cell belongs sends the target uplink grant to the UE in the random access process of the target cell, where the target uplink grant is the uplink grant used by the MAC layer of the UE when the predetermined condition is met; and the predetermined condition includes any one of the following: the switching succeeds, the secondary cell group SCG is changed successfully, the random access succeeds in the switching process, and the random access succeeds in the SCG change process; and the target uplink grant is used to switch the sending path of the uplink data. According to the solution, in a dual-connectivity mobility procedure, the target network device sends the target uplink grant (the uplink grant used by the MAC layer of the UE when the predetermined condition is met; used to switch the sending path of the uplink data) to the UE in the random access process, so that the UE can switch the sending path of the uplink data in time by using the target uplink grant in the dual-connectivity mobility procedure, to reduce a probability of interruption or delaying of sending of the uplink data.

In another case, the transceiver 802 is configured to send, based on a target condition, target indication information to a source network device to which a source cell belongs, where the target indication information is used to indicate that the UE has switched a sending path of uplink data from the source cell to the target cell; the target condition includes any one of the following: performing sending when the target network device receives uplink data that is sent by the UE by using the target cell, performing sending when a predetermined condition is met, and performing sending when the predetermined condition is met and the target network device sends the first uplink grant used for the target cell to the UE; and the predetermined condition includes any one of the following: the switching succeeds, the SCG is changed successfully, random access of the target cell succeeds in a switching process, and random access of the target cell succeeds in an SCG change process.

According to the network device provided in this embodiment of the present disclosure, the target network device to which the target cell belongs sends, based on the target condition, the target indication information to the source network device to which the source cell belongs, where the target indication information is used to indicate that UE has switched the sending path of the uplink data from the source cell to the target cell. According to the solution, in the dual-connectivity mobility procedure, the target network device sends the target indication information to the source network device, so that after receiving the target indication information, the source network device can learn in time that the UE has switched the sending path of the uplink data and the source network device does not need to re-send the dynamically scheduled uplink grant to the UE, to avoid interruption or delaying of sending of the uplink data.

In this embodiment of the present disclosure, in FIG. 11, a bus architecture may include any quantity of interconnected buses and bridges, and is specifically linked by various circuits of one or more processors represented by the processor 801 and a memory represented by the memory 803. The bus architecture may further link various other circuits such as those of a peripheral device, a voltage regulator, and a power management circuit. These are well known in the art, and therefore are not further described in this specification. The bus interface provides an interface. The transceiver 802 may be a plurality of elements, in other words, include a transmitter and a receiver, and provide a unit for communicating with various other devices on a transmission medium. For different UE, the user interface 804 may be alternatively an interface for externally and internally connecting a required device. The connected device includes, but not limited to: a keypad, a display, a speaker, a microphone, and a joystick. The processor 801 is responsible for managing the bus architecture and common processing, and the memory 803 may store data used when the processor 801 performs an operation. In addition, the network device 800 further includes some function modules not shown, and details are not described herein.

Optionally, an embodiment of the present disclosure further provides a network device, including a processor 801 and a memory 803 shown in FIG. 11, and a computer program that is stored in the memory 803 and that is capable of being executed by the processor 801. When the computer program is executed by the processor 801, processes of the path switching method in the foregoing embodiments can be implemented, and a same technical effect can be achieved. To avoid repetition, details are not described herein again.

An embodiment of the present disclosure further provides a communications system, where the communications system includes the UE and the network device described in the foregoing embodiments.

An embodiment of the present disclosure further provides a computer readable storage medium. The computer readable storage medium stores a computer program. When the computer program is executed by the processor 610 shown in FIG. 9 or the processor 801 shown in FIG. 11, processes of the foregoing method embodiment are implemented, and a same technical effect can be achieved. To avoid repetition, details are not described herein again. The computer readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such a process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing implementations. The foregoing implementations are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

The invention claimed is:

1. A path switching method, applied to user equipment UE, wherein the method comprises:
   switching a sending path of uplink data from a source cell to a target cell when a target uplink grant is used in a dual-connectivity mobility procedure, wherein
   the target uplink grant is an uplink grant used by a MAC layer of the UE when a predetermined condition is met; and the predetermined condition comprises any one of the following: the switching succeeds, the SCG is changed successfully, the random access of the target cell succeeds in the switching process, and the random access of the target cell succeeds in the SCG change process;
   wherein the target uplink grant comprises any one of the following:
   the first uplink grant that is used for the target cell and that is used by the MAC layer of the UE;
   an uplink grant that is used for the target cell and that corresponds to an earliest time of sending, by the UE, the uplink data.

2. The method according to claim 1, wherein the switching a sending path of uplink data from a source cell to a target cell based on a target uplink grant comprises:
   switching the sending path of the uplink data from the source cell to the target cell when the MAC layer of the UE uses the target uplink grant.

3. The method according to claim 1, wherein the target uplink grant further comprises:
   the first uplink grant that is received by the UE and that is used for the target cell.

4. The method according to claim 1, wherein before the switching a sending path of uplink data from a source cell to a target cell based on a target uplink grant, the method further comprises:
   in a random access process of the target cell, receiving the target uplink grant from a target network device to which the target cell belongs.

5. The method according to claim 4, wherein the random access process is a contention-based four-step random access process, and the target uplink grant is an uplink grant transmitted in the fourth step in the random access process; and
   the switching a sending path of uplink data from a source cell to a target cell based on a target uplink grant comprises:
   switching the sending path of the uplink data from the source cell to the target cell based on the target uplink grant in a case of contention resolution.

6. The method according to claim 1, wherein the method further comprises:
   sending first indication information to a source network device to which the source cell belongs, wherein the first indication information is used to indicate that UE has switched the sending path of the uplink data from the source cell to the target cell.

7. A path switching method, applied to a target network device to which a target cell belongs, wherein the method comprises:
   in a random access process of the target cell, sending a target uplink grant to user equipment UE, wherein
   the target uplink grant is an uplink grant used by a MAC layer of the UE when a predetermined condition is met; and the predetermined condition comprises any one of the following: switching succeeds, a secondary cell group SCG is changed successfully, the random access succeeds in a switching process, and the random access succeeds in an SCG change process; and
   the target uplink grant is used to switch the sending path of the uplink data to the target cell when the target uplink grant is used by the UE in a dual-connectivity mobility procedure;
   wherein the target uplink grant comprises any one of the following:
   the first uplink grant that is used for the target cell and that is used by the MAC layer of the UE;
   an uplink grant that is used for the target cell and that corresponds to an earliest time of sending, by the UE, the uplink data.

8. The method according to claim 7, wherein the random access is contention-based four-step random access, and the target uplink grant is an uplink grant transmitted in the fourth step in the random access process.

9. User equipment UE, comprising a processor, a memory, and a computer program that is stored in the memory and that is capable of being executed by the processor, wherein the computer program, when executed by the processor, causes the UE to implement path switching method, comprising:
   switching a sending path of uplink data from a source cell to a target cell when a target uplink grant is used in a dual-connectivity mobility procedure, wherein
   the target uplink grant is an uplink grant used by a MAC layer of the UE when a predetermined condition is met; and the predetermined condition comprises any one of the following: the switching succeeds, the SCG is changed successfully, the random access of the target cell succeeds in the switching process, and the random access of the target cell succeeds in the SCG change process;
   wherein the target uplink grant comprises any one of the following:
   the first uplink grant that is used for the target cell and that is used by the MAC layer of the UE;
   an uplink grant that is used for the target cell and that corresponds to an earliest time of sending, by the UE, the uplink data.

10. The UE according to claim 9, wherein the switching a sending path of uplink data from a source cell to a target cell based on a target uplink grant comprises:
    switching the sending path of the uplink data from the source cell to the target cell when the MAC layer of the UE uses the target uplink grant.

11. The UE according to claim 9, wherein the target uplink grant further comprises:
    the first uplink grant that is received by the UE and that is used for the target cell.

12. The UE according to claim 9, wherein before the switching a sending path of uplink data from a source cell to a target cell based on a target uplink grant, the method further comprises:
    in a random access process of the target cell, receiving the target uplink grant from a target network device to which the target cell belongs.

13. The UE according to claim 12, wherein the random access process is a contention-based four-step random access process, and the target uplink grant is an uplink grant transmitted in the fourth step in the random access process; and the switching a sending path of uplink data from a source cell to a target cell based on a target uplink grant comprises:

switching the sending path of the uplink data from the source cell to the target cell based on the target uplink grant in a case of contention resolution.

14. The UE according to claim 9, wherein the method further comprises:

sending first indication information to a source network device to which the source cell belongs, wherein the first indication information is used to indicate that UE has switched the sending path of the uplink data from the source cell to the target cell.

15. A network device, comprising a processor, a memory, and a computer program that is stored in the memory and that is capable of being executed by the processor, wherein when the computer program is executed by the processor, the steps of the path switching method according to claim 7 are implemented.

16. The network device according to claim 15, wherein the random access is contention-based four-step random access, and the target uplink grant is an uplink grant transmitted in the fourth step in the random access process.

17. A non-transitory computer-readable storage medium, wherein the non-transitory computer-readable storage medium stores a computer program, and when the computer program is executed by a processor, the steps of the path switching method according to claim 1 are implemented.

18. A non-transitory computer-readable storage medium, wherein the non-transitory computer-readable storage medium stores a computer program, and when the computer program is executed by a processor, the steps of the path switching method according to claim 7 are implemented.

* * * * *